United States Patent
He et al.

(10) Patent No.: US 10,999,766 B2
(45) Date of Patent: May 4, 2021

(54) METHOD AND SYSTEM FOR SCHEDULING MULTI-ACCESS EDGE COMPUTING RESOURCES

(71) Applicant: Verizon Patent and Licensing Inc., Arlington, VA (US)

(72) Inventors: Dayong He, Bridgewater, NJ (US); Hany Samir Atiya, Clifton, NJ (US); Byunghun Choi, Summit, NJ (US); Ray P. Hwang, Green Brook, NJ (US); Jyotsna Kachroo, Millburn, NJ (US); Kalyani Bogineni, Hillsborough, NJ (US); Sudhakar Reddy Patil, Flower Mound, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 100 days.

(21) Appl. No.: 16/285,792

(22) Filed: Feb. 26, 2019

(65) Prior Publication Data
US 2020/0275313 A1  Aug. 27, 2020

(51) Int. Cl.
*H04W 28/08* (2009.01)
*H04W 28/02* (2009.01)

(52) U.S. Cl.
CPC ....... *H04W 28/08* (2013.01); *H04W 28/0284* (2013.01)

(58) Field of Classification Search
None
See application file for complete search history.

(56) References Cited

U.S. PATENT DOCUMENTS

| 8,719,401 | B1* | 5/2014 | Gulati | H04L 43/0864 |
| | | | | 709/224 |
| 2011/0058480 | A1* | 3/2011 | Dahlen | H04W 48/06 |
| | | | | 370/237 |
| 2012/0324445 | A1* | 12/2012 | Dow | G06F 9/45504 |
| | | | | 718/1 |
| 2014/0208315 | A1* | 7/2014 | Abali | G06F 9/45533 |
| | | | | 718/1 |
| 2017/0104609 | A1* | 4/2017 | McNamee | H04M 15/61 |
| 2018/0077024 | A1* | 3/2018 | Zhang | H04L 41/12 |
| 2018/0109590 | A1* | 4/2018 | Rao | H04L 67/327 |
| 2018/0351824 | A1* | 12/2018 | Giust | H04L 67/10 |
| 2019/0044812 | A1* | 2/2019 | Loftus | H04L 41/0896 |
| 2019/0045000 | A1* | 2/2019 | Hiremath | H04L 49/501 |
| 2019/0140933 | A1* | 5/2019 | Guim Bernat | H04L 43/08 |
| 2019/0141593 | A1* | 5/2019 | Wei | H04W 24/02 |
| 2019/0200208 | A1* | 6/2019 | Chandramouli | H04W 8/065 |

* cited by examiner

*Primary Examiner* — Scott B Christensen (57) ABSTRACT

Systems and methods described herein provide an intelligent MEC resource scheduling service. A network device in a MEC network stores, in a memory, threshold values indicating overload conditions for resource usage by a first MEC cluster; monitors resource usage in the first MEC cluster; determines, based on the monitoring, when one of the threshold values is reached; identifies available resources in a second MEC cluster; and re-directs, based on the identifying, at least some of the resource usage from the first MEC cluster to the second MEC cluster.

20 Claims, 9 Drawing Sheets

METHOD AND SYSTEM FOR SCHEDULING MULTI-ACCESS EDGE COMPUTING RESOURCES

BACKGROUND

Development and design of radio access networks (RANs) present challenges from a network-side perspective and an end device perspective. To enhance performance, Multi-access Edge Computing (MEC) (also known as mobile edge computing) is being explored. In MEC, core network capabilities (e.g., computational, storage, etc.) are situated at the network edge to improve latency and reduce traffic. In contrast with core network workloads, for example, MEC workloads can vary more significantly at each MEC location. Local cycles of human activity, unscheduled events, planned activities, local emergencies, and the like that may have nominal impact on large scale network services (e.g., nationally or regionally-based services) can reflect more heavily on local MEC workloads.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

New broadband cellular networks offer new features and benefits, such as high bandwidth, low latency, and support for massive Internet of Things (IoT) data transfers. One enhancement made possible through these new networks is the use of Multi-access Edge Computing (MEC) servers. These edge servers allow high network computing loads to be transferred onto the edge servers. Depending on the location of the edge servers relative to the point of attachment (e.g., a wireless station for an end device), MEC servers may provide various services and applications to end devices with minimal latency. Generally, lower latencies are achieved when MEC servers are positioned with shorter distances to a network edge. Thus, service providers will need to establish MEC resources in multiple geographic regions to minimize latency for services to mobile devices and guarantee certain quality-of-service (QoS) levels. Due to the cycles of human activity and other factors, workloads in some MEC service areas at any point in time may be lighter or heavier than workloads in other MEC service areas.

According to implementations described herein, an intelligent MEC resource scheduling service is provided. MEC resources are intelligently shared to maximize availability to meet the latency/bandwidth requirements for different types of customer traffic. MEC resources in more lightly-loaded MEC areas can be used to serve less-latency-sensitive workloads from the heavily-loaded MEC areas. If end device demands increase for a MEC area and exceed a configured threshold for the total resource capacity of the MEC area servicing the end devices, then end devices with lower priority (e.g., from an application latency aspect) can be offloaded to a neighboring MEC area. Examples of such resources may be a central processing unit (CPU), graphics processing unit (GPU), memory, bandwidth, etc. As described further herein, distributed intelligence is provided in the resource scheduling, so that computing resources across all available MEC areas can be used efficiently.

Figure 1:
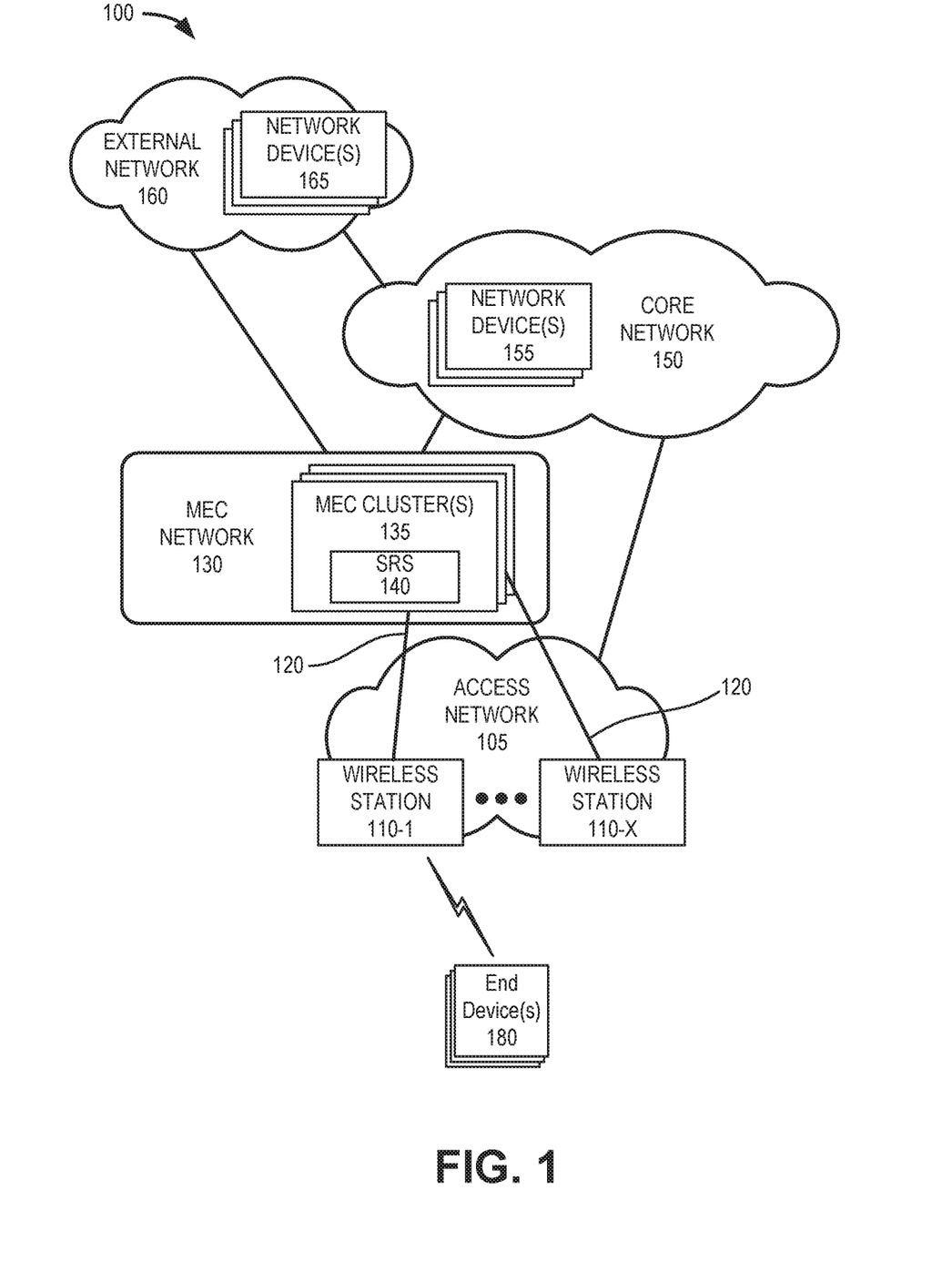
FIG. 1 illustrates an exemplary environment in which an exemplary embodiment of a MEC prediction service may be implemented.

FIG. 1 illustrates an exemplary environment 100 in which an embodiment of the intelligent MEC resource scheduling service may be implemented. As illustrated, environment 100 includes an access network 105, a MEC network 130, a core network 150, and an external network 160. Access network 105 may include wireless stations 110-1 through 110-X (referred to collectively as wireless stations 110 and generally as wireless station 110). MEC network 130 may include MEC clusters 135 with smart resource schedulers (SRS) 140; core network 150 may include network devices 155; and external network 160 may include network devices 165. Environment 100 further includes one or more end devices 180.

The number, the type, and the arrangement of network device and the number of end devices 180 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between end devices 180 and the network devices. Environment 100 may be implemented to include wired, optical, and/or wireless communication links among the network devices and the networks illustrated. A connection via a communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fourth Generation (4G) RAN, a 4.5G RAN, a 5G RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. Wireless stations 110 may connect to MEC network 130 via backhaul links 120, such as wired or optical links. According to various embodiments, access network 105 may be implemented according to various architectures of wireless service, such as, for example, macrocell, microcell, femtocell, or other configuration. Additionally, according to various exemplary embodiments, access network 105 may be implemented according to various wireless technologies (e.g., radio access technology (RAT), etc.), wireless standards, wireless frequencies/bands, and so forth.

MEC network 130 includes a platform that provides services at the edge of a network, such as access network 105. MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

For purposes of illustration and description, MEC clusters 135 (also referred to therein as "MEC areas") include the various types of network devices that may be resident in MEC network 130. MEC clusters 135 may be located to provide geographic proximity to various groups of wireless stations 110. Some MEC clusters 135 may be co-located with network devices 155 of core network 150. According to some exemplary embodiments, each MEC cluster 135 may include a local SRS 140.

SRS 140 may include logic that provides the intelligent MEC resource scheduling services described herein. Each SRS 140 may monitor and predict resource usage at a local MEC cluster 135. Each SRS 140 in each local MEC cluster 135 may send its own status information and receive status information of other MEC clusters 135. SRS 140 may set priorities for the types of workloads and set thresholds for resource usage in the local MEC cluster 135. As described further herein, the priorities of the workloads are defined according to the requirements of the latency and performance of the workloads. According to an exemplary embodiment, SRS 140 may be included as logic within each of MEC clusters 135. According to another implementation, one or more functions of SRS 140 described herein may be included in a centralized global orchestration system for MEC network 130.

Each SRS 140 may attempt to use the resources from the local MEC cluster 135 for workloads with high priorities. In one implementation, each local MEC cluster 135 includes dedicated resources for high priority workloads, allocated for predicted workloads at each MEC cluster 135. When the usage of resources at the local MEC cluster 135 reaches a pre-defined threshold, indicating a potential impact to the end user experiences, SRS 140 will try to offload low priority workloads/traffic to the other lightly-loaded MEC clusters 135 for services.

Each local SRS 140 may communicate periodically with the other SRSs 140 about its status. When a local MEC cluster 135 is lightly-loaded, the SRS 140 may notify SRSs 140 in other MEC clusters 135, indicating the types of resources available to contribute, the quantity of resources available to contribute, and estimation of how long the MEC cluster 135 can contribute.

According to another implementation, SRS 140 may also broadcast an emergency request to the other SRSs 140 for additional resources to handle a high workload. When the emergency request is received, other SRSs 140 may share their status information with the requesting SRS 140, indicating resources currently available and a forecast of resource usage (e.g., for the next few hours). The requesting SRS 140 may select the MEC cluster(s) 135 to server/share the emergency workload until the level of traffic is reduced below a threshold value at the local MEC cluster 135.

Core network 150 may include one or multiple networks of one or multiple network types and technologies to support access network 105. For example, core network 150 may be implemented to include a next generation core (NGC) network for a 5G network, an Evolved Packet Core (EPC) of an LTE network, an LTE-A network, an LTE-A Pro network, and/or a legacy core network. Depending on the implementation, core network 150 may include various network devices 155, such as for example, a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 150 may include additional, different, and/or fewer network devices than those described. For purposes of illustration and description, network devices 155 may include various types of network devices that may be resident in core network 150, as described herein.

External network 160 may include one or multiple networks. For example, external network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., 50/100 Mbps, ultralow-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services.

Depending on the implementation, external network 160 may include various network devices 165 that provide various applications, services, or other type of end device assets, such as servers (e.g., web, application, cloud, etc.), mass storage devices, data center devices, and/or other types of network devices pertaining to various network-related functions. According to an exemplary embodiment, one or multiple network devices 165 may also be included within MEC clusters 135 to support the intelligent MEC resource scheduling service, as described herein.

End device 180 includes a device that has computational and wireless communication capabilities. End device 180 may be implemented as a mobile device, a portable device, a stationary device, a device operated by a user, or a device not operated by a user. For example, end device 180 may be implemented as a Mobile Broadband device, a smartphone, a computer, a tablet, a netbook, a wearable device, a vehicle support system, a game system, a drone, or some other type of wireless device. According to various exemplary embodiments, end device 180 may be configured to execute various types of software (e.g., applications, programs, etc.). End device 180 may support one or multiple RATs (e.g., 4G, 5G, etc.), one or multiple frequency bands, network slicing, dual-connectivity, and so forth. Additionally, end device 180 may include one or multiple communication interfaces that provide one or multiple (e.g., simultaneous or non-simultaneous) connections via the same or different RATs, frequency bands, etc.

Figure 2:
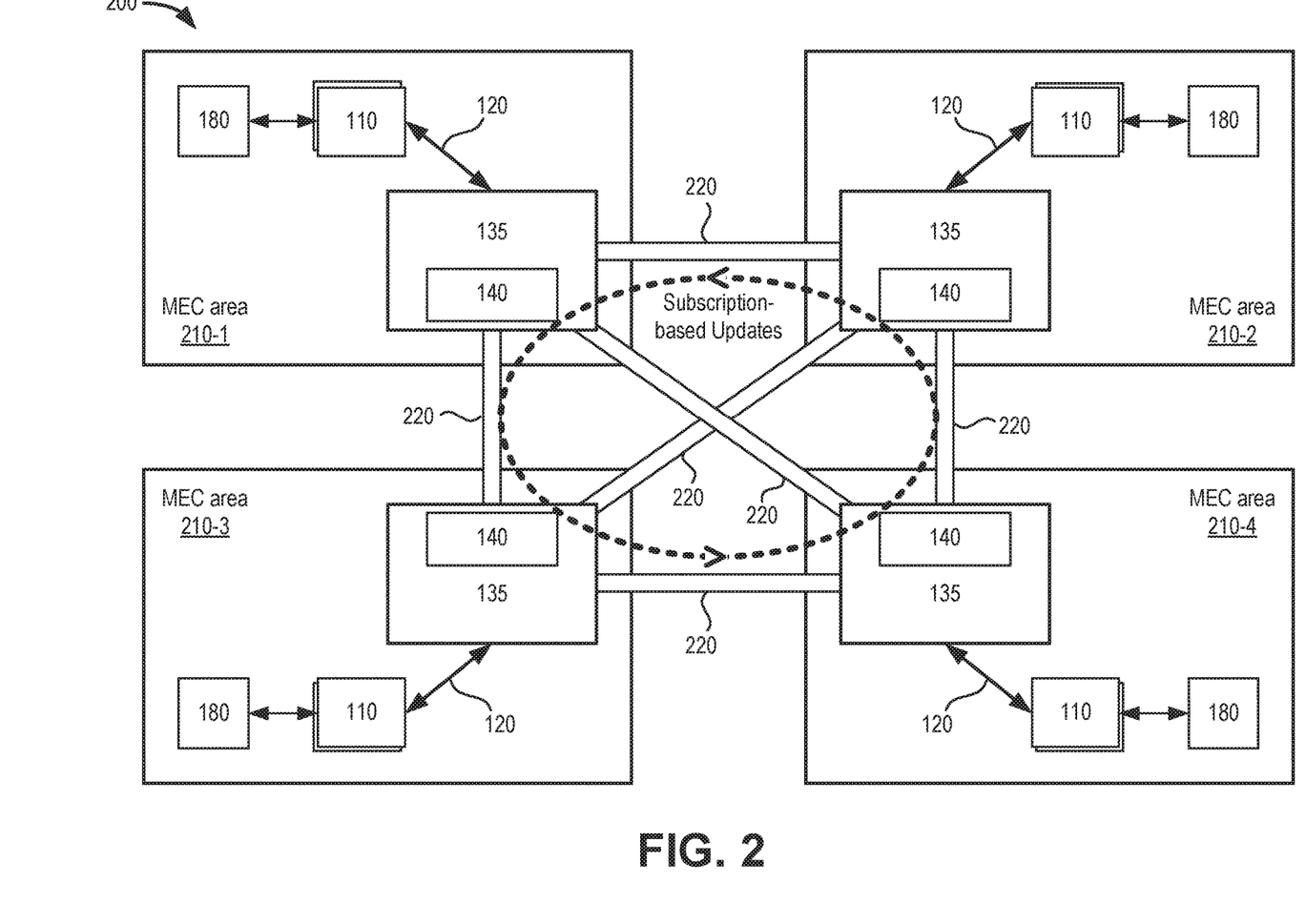
FIG. 2 is a diagram of exemplary network connections in a portion of the environment of FIG. 1.

FIG. 2 is a diagram of exemplary network connections in a network portion 200 of environment 100. As shown in FIG. 2, network portion 200 may include multiple MEC areas 210-1 through MEC area 210-4. Each MEC area 210 may include a MEC cluster 135 with an SRS 140 and multiple wireless stations 110 servicing end devices 180. Each MEC cluster 135 may be connected within MEC network 130. Each MEC cluster 135 may be communicatively coupled to one or more wireless station 110 (e.g., via wired or optical links 120). End devices 180 may have a wireless connection with wireless station 110 via one or more RAT types. The MEC cluster 135 and/or SRS 140 in each MEC area 210 is connected to the MEC clusters 135 and/or SRSs 140 in each of other MEC areas 210 by wired connections 220 (e.g. optical fibers).

In the arrangement of network portion 200, the transport/link between any two MEC areas 210 is optimized and the latency between any two MEC areas 210 is minimized. The SRSs 140 in connected MEC areas 210 may subscribe with each other to share information of local MEC cluster 135 resource usages, forecasts, and availabilities.

While FIG. 2 shown four MEC areas 210 for simplicity, in practice dozens or hundreds of MEC areas 210 may be located on a national or regional scale for a particular service provider.

Figure 3:
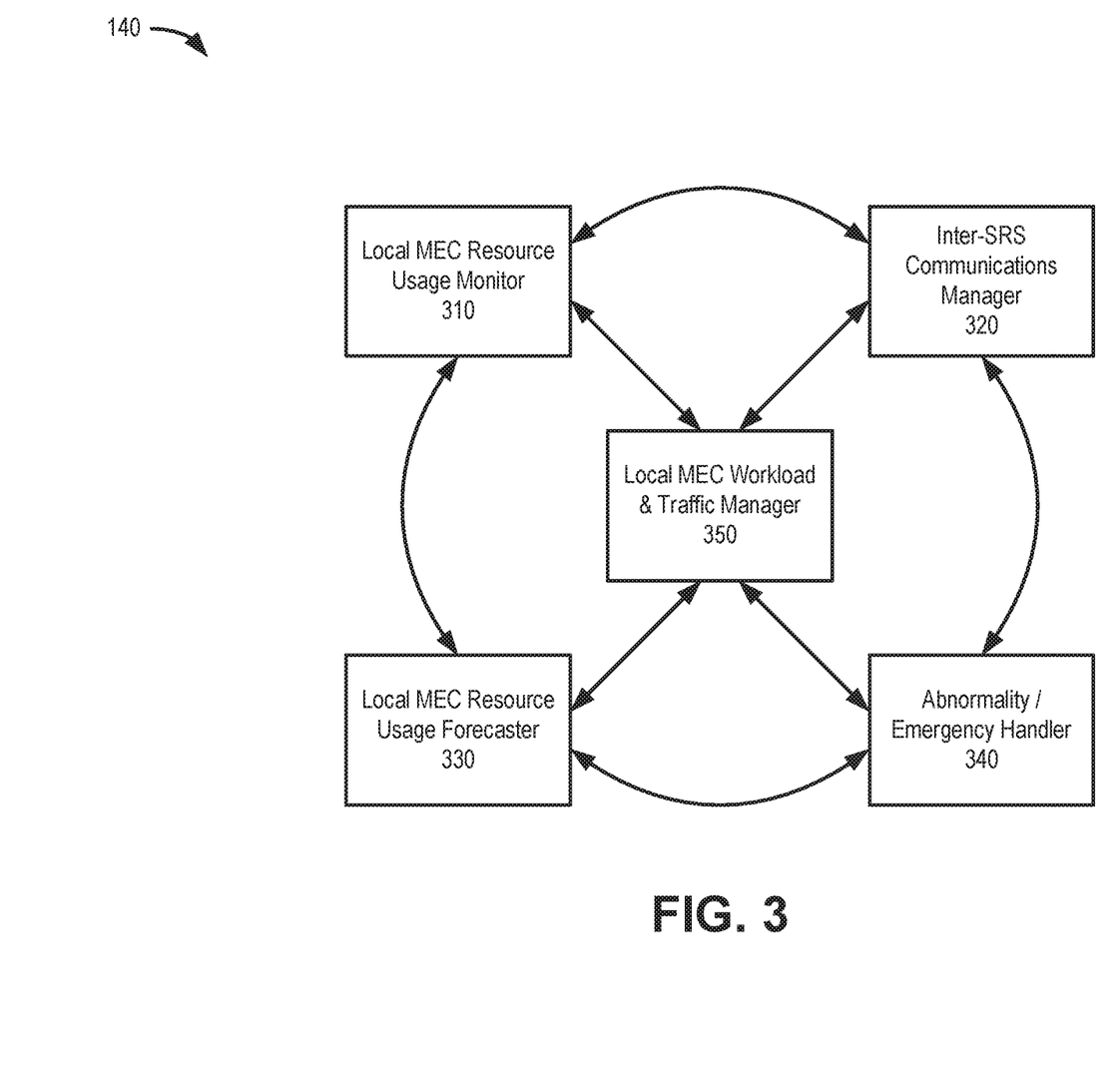
FIG. 3 illustrates exemplary logical components of the smart resource scheduler of FIGS. 1 and 2.

FIG. 3 is a diagram illustrating exemplary components of smart resource scheduler (SRS) 140. In one implementation, all or some of the components illustrated in FIG. 3 may be implemented by a processor (e.g. processor 410 described below in connection with FIG. 4) executing software instructions stored in a memory (e.g., memory/storage 415). As shown in FIG. 3, SRS 140 may include a local MEC Resource usage monitor 310, an inter-SRS communications manager 320, a local MEC resource usage forecaster 330, an anomaly/emergency handler 340, and a local MEC workload and traffic manager 350.

Local MEC resource usage monitor 310 may monitor the resource usage of a respective local MEC cluster 135 (e.g., in MEC area 210-1 or 210-2, etc.). Resource usage may include, for example, such as CPU/GPU usage, RAM usage, storage usage, bandwidth usage, etc., by MEC cluster 135. Resource usage may be monitored and reported to other MEC areas 210 (e.g., respective SRSs 140).

Inter-SRS communications manager 320 may communicate with other MEC clusters 135 about, for example, MEC resource usages and availability of MEC resources. Resource usage information about a local MEC cluster 135 may be shared with the SRSs 140 in other MEC areas 210. Additionally, inter-SRS communications manager 320 may exchange messages with remote MEC clusters 135 to facilitate workload handovers.

Local MEC resource usage forecaster 330 may be used to predict/forecast MEC resource usages in the future, such as a period of the next few hours, days, etc., for an individual MEC cluster 135. Local MEC resource usage forecaster 330 may provide forecasts for CPU usage, RAM usage, storage usage, bandwidth usage, etc. According to one implementation, Local MEC resource usage forecaster 330 may distribute forecasts to other MEC areas 210 (e.g., respective SRSs 140) through periodic messages or responses to requests via inter-SRS communications manager 320.

According to one implementation, local MEC resource usage forecaster 330 may locally apply artificial intelligence (AI), such as machine learning (ML) or deep learning (DL), to forecast MEC resource usage. The algorithms and models used in AI may be the same at each local MEC resource usage forecaster 330. Data used in AI may be shared across MEC areas 210. In another implementation, AI computations may performed using be shared MEC resources. For example, computations may be done at MEC areas 210 with light workloads, with results sent to interested parties or a requester. AI computations may be used for analytics on resource usage at one MEC area 210, on an individual application instance, on a service from one 5G MEC area.

Abnormality/emergency handler 340 may be used to detect a local abnormality of resource usage and/or emergency situations in a local MEC cluster 135. When the resource usages of a local MEC cluster 135 reach a predefined criteria value, abnormality/emergency handler 340 may treat the situation as an abnormality or emergency. In one implementation, abnormality/emergency handler 340 may rely on predictive forecasts from local MEC resource usage forecaster 330 to detect an abnormality. An abnormality may include, for example, above- or below-normal resource use by a particular application or user that may not lead to an imminent service disruption. An emergency, in contrast, may include, for example, a network disruption or physical problem that impacts delivery or services.

Local MEC workload and traffic manager 350 may consume analytics data from local MEC resource usage monitor 310, local MEC resource usage forecaster 330, and abnormality/emergency handler 340, as well as data received from other MEC clusters 135 via inter-SRS communications manager 320. Based on the analytics data, local MEC workload and traffic manager 350 may make recommendations on whether the traffic could be better routed to other available MEC resources (MEC clusters 135 in other MEC areas 210). For example, local MEC workload and traffic manager 350 may store threshold values (e.g., as absolute values or percentage levels of different resources) that may be compared with current or forecasted analytics data to determine whether to off-load some traffic to remote MEC clusters.

According to an implementation, local MEC workload and traffic manager 350 may store rules that designate priority levels for different types of traffic. For example, in each MEC cluster 135, there may be dedicated resources for workloads with different types of priorities. A threshold value may be selected for each type of workload according to its priority. Table 1 below illustrates different priorities and threshold levels that may be assigned for use by local MEC workload and traffic manager 350 in determining whether local traffic needs to be off-loaded.

TABLE 1

| Priority | Threshold of Local Resource Usage | Workload | Example of Workload |
| --- | --- | --- | --- |
| Extremely high | 80% | Workload requiring extreme high bandwidth, extreme low latency | Live VR, AR, smart car, robotics |
| Very high | 80% | Workload requiring very high bandwidth, very low latency | Cloud games, HD streaming |
| High | 85% | Workload requiring high bandwidth, low latency | HD Video call, smart assistant |
| Medium | 90% | Workload requiring medium bandwidth and latency | Traditional streaming, video call |
| Low | 90% | Workload using low bandwidth, no requirement for latency | Traditional web browsing |
| Extremely low | 95% | Workload using low bandwidth, no requirement for latency | Sending/receiving text messages |

When usage of the resources in local MEC area for the type of workload reaches the threshold value (e.g., 80%, 85%, etc.), local MEC workload and traffic manager 350 may pull in additional resources to handle the workload, either from local temporary resources or remote MEC clusters 135. The type of workload for incoming traffic/service request may be determined, for example, by a QoS indicator associated with the traffic flow. In one implementation, to avoid conflicts, each MEC cluster 135 in an MEC area 210 may apply the same rules as those used in other MEC areas. Table 2 below illustrates general rules that may be applied by local MEC workload and traffic manager 350 for different workload priority types.

TABLE 2

| Priority of Workload | Rules for Selecting MEC Resources |
| --- | --- |
| Extremely high | Always look for local MEC resources first<br>If needed, always look for remote MEC resources with lowest latency to end devices |
| Very high | Always look for local MEC resources first<br>If needed, always look for remote MEC resources with lowest latency to end devices |
| High | Always look for local MEC resources first<br>If needed, always look for remote MEC resources with lowest latency to end devices |
| Medium | Look for local MEC resources as well as remote MEC resources<br>When possible, use local MEC resources<br>If needed, use remote MEC resources |
| Low | Look for local MEC resources as well as remote MEC resources<br>When possible, use remote MEC resources |
| Extremely low | Always look for remote MEC resources as well as local resources<br>When possible, use remote MEC resource first |

The following use case illustrates the intelligent MEC resource scheduling service. After initial deployment, 5G service carriers may setup additional MEC resources to serve the increasing customer needs. For example, in New York City, a carrier can set up several MEC clusters 135 in each district/borough. These MEC clusters 135 can be close to each other and the round trip time of network traffic from nearby MEC cluster resources can meet the requirements for latency and bandwidth. When one MEC cluster 135 is heavily loaded with customer traffic, some of the MEC resources in one MEC areas 210 may not meet the latency/bandwidth requirements, but MEC resources from nearby MEC areas 210 may meet the latency/bandwidth requirements. In this case, MEC resources from nearby MEC clusters 135 can be treated as local resources and can be pulled in to serve customer traffic. In one implementation, if links between MEC clusters 135 (e.g., transport links 220) are optimized, it may be assumed that an MEC cluster 135 (if not also overloaded) closest to the heavily loaded MEC cluster 135 will have the lowest latencies to end device 180 that were previously being services by the heavily loaded MEC cluster 135.

The above example may change when the nearby MEC cluster 135 also becomes heavily loaded by customer traffic. Thus, SRS 140 may constantly share the information of its local MEC cluster 135 with the SRS 140 in the other MEC clusters 135.

Two factors in determining whether MEC resources can be treated as local include (1) if the MEC resources are close to the user, and (2) if the performance of the MEC resources meets the latency/bandwidth requirements. When determining whether the MEC resources are close enough to the user, the SRS 140 may consider geophysical distance (e.g., the distance between the MEC location and the user) and fiber lengths (e.g., whether the fiber length from the gNB 110 to the MEC cluster 135 is smaller than the fiber length from the gNB 110 to the other MEC clusters 135). Some MEC clusters 135 could be geophysical close to the user, but the fiber length between the MEC cluster 135 and the gNB may not be short enough. To determine whether the performance of the MEC resources meets the latency/bandwidth requirements, SRS 140 may constantly monitor the performance of the MEC resources.

Although FIG. 3 shows exemplary logical components of SRS 140, in other implementations, SRS 140 may include fewer components, different components, or additional functional components than those depicted in FIG. 3. Additionally or alternatively, one or more functions of the components of SRS 140 may be performed by, or assisted by, another network device in environment 100.

Figure 4:
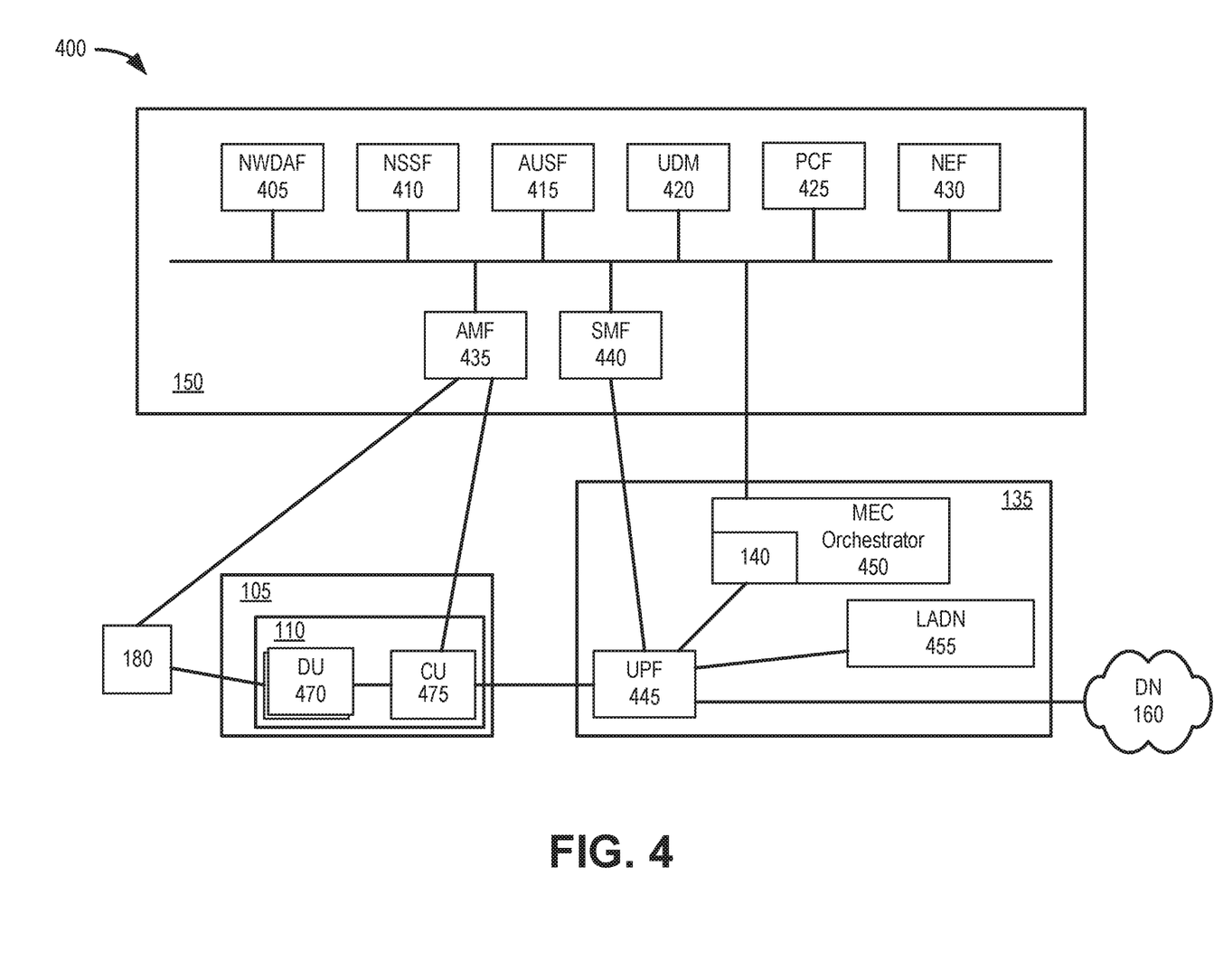
FIG. 4 is a diagram of exemplary network connections in another portion of the environment of FIG. 1.

FIG. 4 is a diagram of exemplary network connections in a network portion 400 of network environment 100. More particularly, network portion 400 illustrates an implementation of the intelligent MEC resource scheduling service in a 5G network environment. As shown in FIG. 4, network portion 400 may include access network 105 with wireless station 110, MEC cluster 135, core network 150, external network 160, and end device 180.

In the example of FIG. 4, access network 105 may include a 5G New Radio network. Wireless station 110 may include a gNB 110 having, for example, one or more distributed units (DU) 470 and a centralized unit (CU) 475. In some implementation, DU 470 and CU 475 may be co-located.

MEC cluster 135 may include a UPF 445, an MEC orchestrator 450, and a local area data network (LADN) 455. Thus, in contrast with other 5G embodiments, in the configuration of FIG. 4, the user plane function (e.g., UPF 445) is located within MEC cluster 135, instead of core network 150.

UPF 445 may maintain an anchor point for intra/inter-RAT mobility, maintain an external Packet Data Unit (PDU) point of interconnection to a data network (e.g., DN 460), perform packet routing and forwarding, perform the user plane part of policy rule enforcement, perform packet inspection, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNB 110), and/or perform other types of user plane processes. UPF 445 may communicate with SMF 440 (e.g., using an N4 interface) and connect to data network 460 (e.g., using an N6 interface).

MEC orchestrator 450 may automate sequences of activities, tasks, rules, and policies needed for on-demand creation, modification, or removal of network, application, or infrastructure services and resources. MEC orchestrator 450 may provide orchestration at a high level, with an end-to-end view of the infrastructure, network, and applications. In the configuration of FIG. 4, MEC orchestrator 450 may include an SRS 140 or some logical components of SRS 140.

As shown in FIG. 4, core network 150 may include a Network Data Analytics Function (NWDAF) 405, an NSSF 410, an AUSF 415, a UDM 420, a PCF 425, a network exposure function (NEF) 430, an AMF 435, and a SMF 440. NWDAF 405, NSSF 410, AUSF 415, UDM 420, PCF 425, NEF 430, AMF 435, and SMF 440 may correspond, for example, to network devices 155 of FIG. 1. In another implementation, multiple logical components may be executed on a single network device 155.

NWDAF 405 may include logic that analyzes congestion information (such as MEC resource usage from MEC clusters 135). NWDAF 405 may include logic that stores congestion threshold parameters and values, and may use these parameters and values for comparison to the parameters and values included in the congestion information received from MEC clusters 135. The congestion threshold parameters and values may pertain to load levels in relation to various network resources (e.g., physical, logical, virtual) including, for example, CPU, GPU, and memory; bandwidth, etc. According to an exemplary embodiment, NWDAF 405 may determine whether congestion and/or predictive congestion exist(s) based on a result of the comparison.

NSSF 410 may select a set of network slice instances to serve a particular end device 180, determine a particular AMF 220 to serve a particular end device 180, and/or perform other types of processes associated with network slice selection or management. AUSF 415 may manage permissions for end devices 180. For example, AUSF 415 may verify that an end device 180 is authorized to access particular types of network services. UDM 420 may maintain subscription information for end devices 180. For example, UDM 420 may create an authentication vector, manage user profiles, perform subscription management, conduct roaming authorization, etc. PCF 425 may provide policy rules to control plane functions (e.g., to SMF 240). NEF 430 may expose capabilities and events to other network functions, including third party NFs, application functions, edge computing network functions, and/or other types of network functions. AMF 435 may perform control plane functions such as registration, authentication, paging, and bearer setup. SMF 440 may provide control plane functions, such as assigning an end device IP address, interfacing with QoS policy, and configuring a UPF (e.g., UPF 445) for packet forwarding.

In the configuration of FIG. 4, SRS 140 is treated as a component of the MEC orchestrator 450 in the local MEC cluster 135.

Resources (e.g., CPU, GPU, RAM, storage, etc.) at each local MEC cluster 135 may be virtualized. Applications and services at the local MEC cluster 135 consume the virtualized resources. SRS 140 at the local MEC cluster 135 monitors and forecasts resource usages at the local MEC 135. SRS 140 at the local MEC cluster 135 shares the resource usage information and resource availability with SRSs 140 at other MEC clusters 135.

SRS 140 may communicate with NWDAF 405 to obtain network status information. SRS 140 may also communicate with UPF 445 to obtain application-specific traffic information. SRS 140 may communicate with other 5G core network components, such as UDM 420, PCF 425, etc., to obtain other information about the user and service quality requirements. SRS 140 may recommend whether the user traffic should use local MEC cluster 135 resources or can be routed to other available resources in other MEC clusters 135. When resources at local MEC cluster 135 are available, these available resources can be used to serve user requests from other MEC areas 210.

Although FIG. 4 shows an exemplary arrangement of components of network portion 400, in other implementations, network portion 400 may include fewer components, different components, differently-arranged components, or additional components than depicted in FIG. 4. For example, in another implementation, an NWDAF component may be included within local MEC clusters 135 to reduce the time for the SRS 140 to get information from NWDAF 405 in the core network 150.

Figure 5:
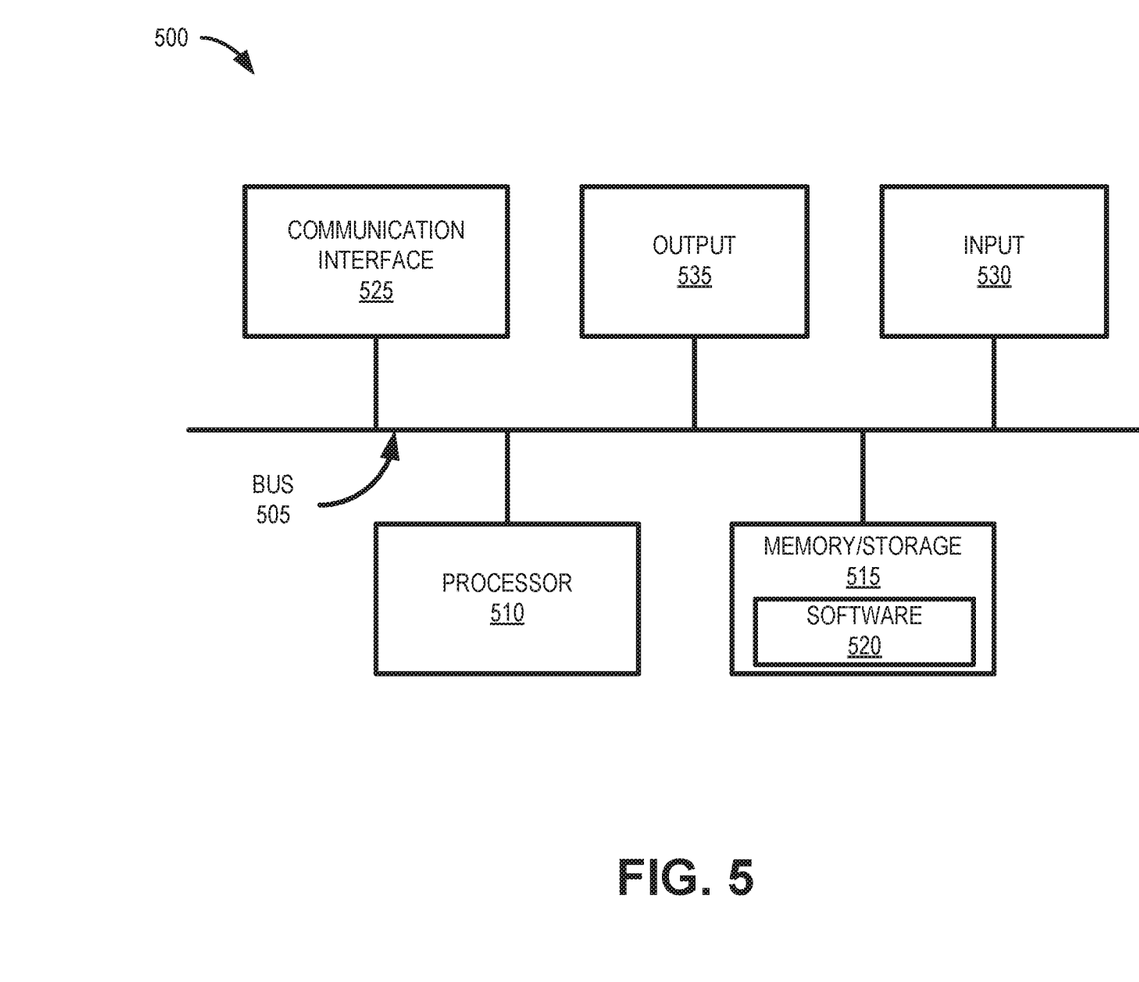
FIG. 5 illustrates exemplary components of a device that may correspond to one or more of the devices illustrated and described herein.

FIG. 5 is a diagram illustrating example components of a device 500 according to an implementation described herein. Wireless station 110, MEC cluster 135, SRS 140, network device 155, network device 165, end device 180, and/or UPF 445, MEC orchestrator 450 may each include one or more devices 500. In another implementation, a device 500 may include multiple network functions. As illustrated in FIG. 5, according to an exemplary embodiment, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, and/or clocks.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc. Processor 510 may be a dedicated component or a non-dedicated component (e.g., a shared resource).

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include a drive for reading from and writing to the storage medium.

Memory/storage 515 may be external to and/or removable from device 500, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. Software 520 may include an operating system. Software 520 is also intended to include firmware, middleware, microcode, hardware description language (HDL), and/or other forms of instruction. Additionally, for example, MEC cluster 135 and/or MEC orchestrator 450 may include logic to perform tasks, as described herein, based on software 520. Furthermore, end devices 180 may store applications that require services/resources from MEC clusters 135.

Communication interface 525 permits device 500 to communicate with other devices, networks, systems, devices, and/or the like. Communication interface 525 includes one or multiple wireless interfaces and/or wired interfaces. For example, communication interface 525 may include one or multiple transmitters and receivers, or transceivers. Communication interface 525 may include one or more antennas. For example, communication interface 525 may include an array of antennas. Communication interface 525 may operate according to a communication standard and/or protocols. Communication interface 525 may include various processing logic or circuitry (e.g., multiplexing/de-multiplexing, filtering, amplifying, converting, error correction, etc.).

Input 530 permits an input into device 500. For example, input 530 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 535 permits an output from device 500. For example, output 535 may include a speaker, a display, a light, an output port, and/or some other type of visual, auditory, tactile, etc., output component. According to some embodiments, input 530 and/or output 535 may be a device that is attachable to and removable from device 500.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
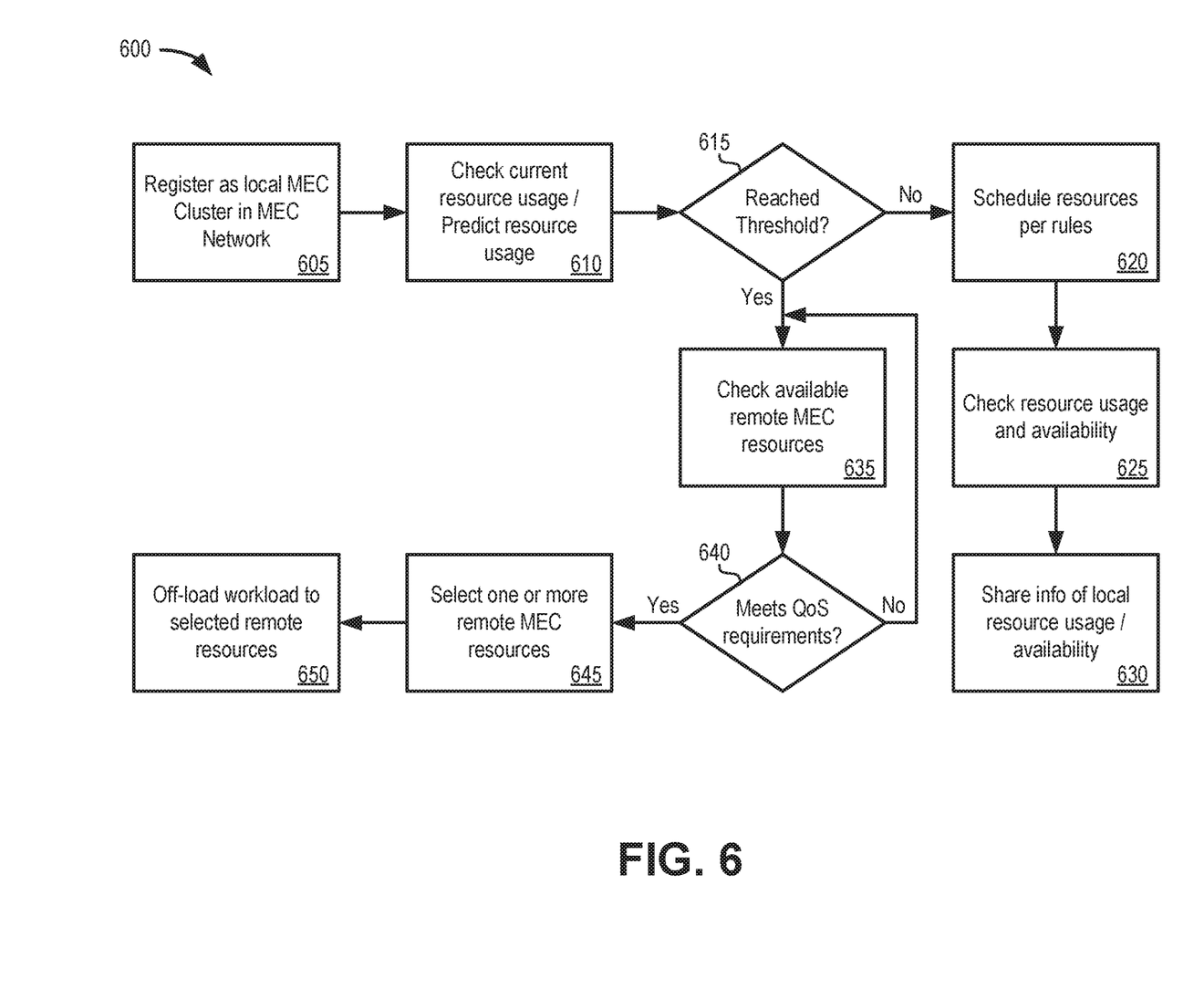
FIG. 6 is a flow diagram illustrating an exemplary process for scheduling MEC resources in the MEC network of FIG. 1.

FIG. 6 is a flow diagram illustrating an exemplary process 600 for scheduling MEC resources in MEC network 130. In one implementation, process 600 may be implemented by an SRS 140 in an MEC cluster 135. In another implementation, process 600 may be implemented by more than one MEC clusters 135 in conjunction with one or more other devices in network environment 100.

As shown in FIG. 6, an MEC cluster may be registered as a local MEC cluster for an MEC network (block 605) and may check for current resource usage and/or predict resource usage (block 610). For example, SRS 140 may register a corresponding local MEC cluster 135 to provide subscription based updates with other MEC clusters in different geographic areas. SRS 140 (e.g., local MEC Resource usage monitor 310 and/or local MEC resource usage forecaster 330) may monitor current MEC resource use and predict future MEC resource use, such as CPU/GPU usage, RAM usage, storage usage, bandwidth usage, or other resources of MEC cluster 135.

Process 600 may also include determining if a workload threshold has been reached (block 615). For example, SRS 140 (e.g., local MEC workload and traffic manager 350) may compare analytics data from local MEC resource usage monitor 310 and/or local MEC resource usage forecaster 330 with stored threshold values to determine whether it is necessary to off-load some traffic to remote MEC clusters. In one implementation, local MEC workload and traffic manager 350 may compare an appropriate threshold value from Table 1 with current/projected resource usage levels for each of the dedicated resources in MEC cluster 135.

If a workload threshold has not been reached (block 615—No), process 600 may include scheduling resources per rules (block 620), checking resource usage and availability (block 625), and sharing information of local resource usage and/or availability (block 630). For example, SRS 140 (e.g., local MEC workload and traffic manager 350) may assign priority levels (e.g., "extremely high," "very high," "high," etc.) to incoming workloads and apply rules based on workload priorities and resource usage levels, such as shown above in Tables 1 and 2. Local MEC workload and traffic manager 350 may also determine if any resources from MEC cluster 135 are available for sharing based on the current and projected workloads. Inter-SRS communications manager 320 may report the current and/or projected workload levels to the MEC clusters 135 in other MEC areas 210 for their consideration.

If a workload threshold has been reached (block 615—Yes), process 600 may include checking available remote MEC resources (block 635), and determining if an available remote MEC resource meets QoS requirements (block 640). For example, when SRS 140 (e.g., local MEC workload and traffic manager 350) determines that an overloaded condition exists or is pending, reports of current and/or projected workload levels at other MEC clusters 135 (e.g., received periodically by inter-SRS communications manager 320) may be reviewed for remote resource availability. Resources with availability may be reviewed/tested for ability to meet QoS requirements for the type of workload that needs to be transferred. QoS requirements may include, for example, available bandwidth, latency, and/or length of available time from the potential remote MEC cluster 135.

If an available remote MEC resource does not meet QoS requirements (block 640—No), process 600 may return to process block 635 to check for other available remote MEC resources. If an available remote MEC resource meets QoS requirements (block 640—Yes), process 600 may include selecting one or more remote MEC resources (block 645), and off-loading workload to selected remote resources (block 650). For example, local MEC workload and traffic manager 350 may apply priority workload rules (e.g., from Table 2 above), latency measurements, geographic distances, and physical link (e.g., link 220) length to select a best available remote MEC cluster 135. Based on the selection criteria, local MEC workload and traffic manager 350 may communicate with end device 180 and/or the selected MEC cluster 135 to facilitate a workload handover.

Figure 7:
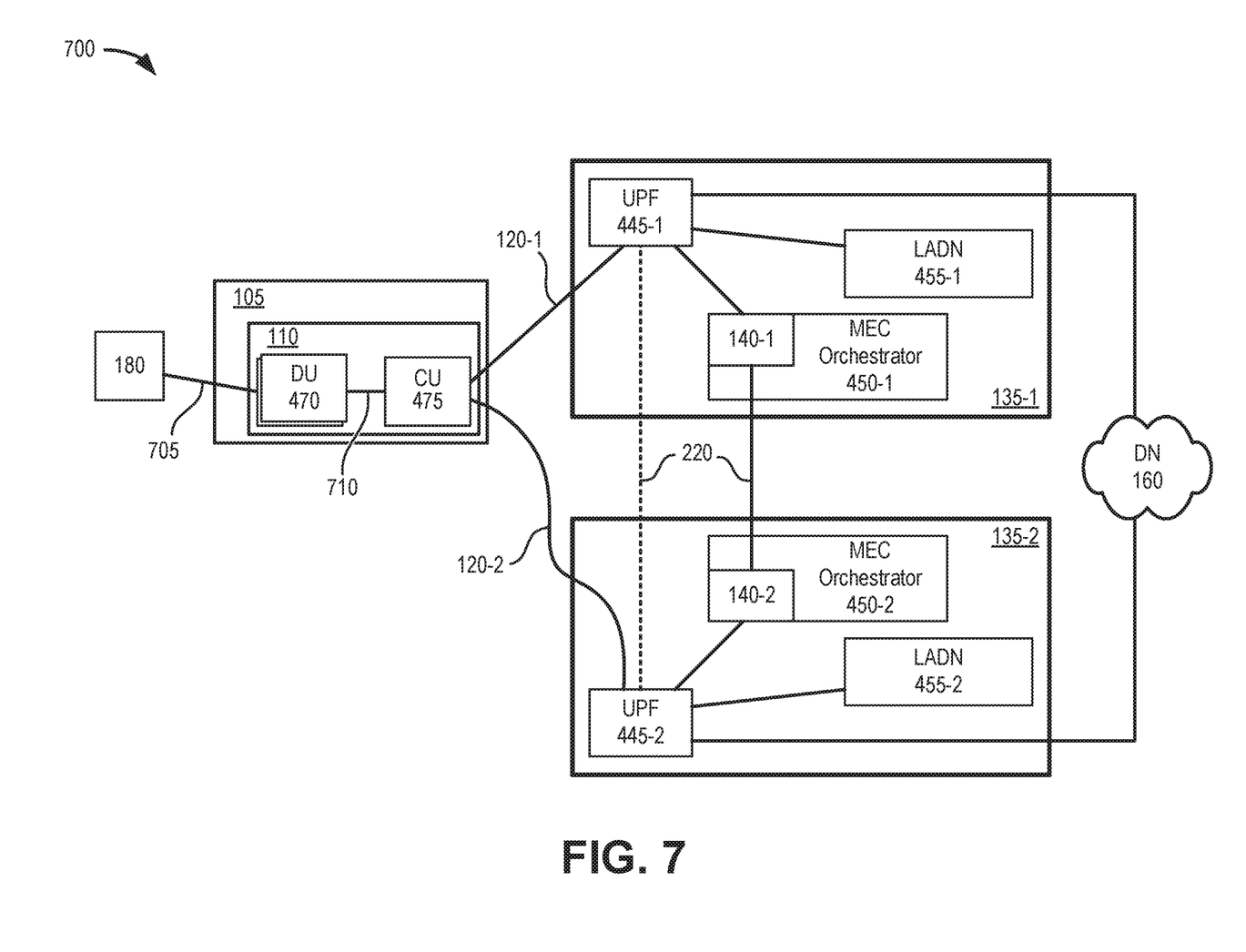
FIG. 7 is a diagram of exemplary communications for selecting resources in remote MEC areas of the MEC network of FIG. 1.

FIG. 7 is a diagram of exemplary communications for selecting resources in a portion 700 of network environment 100. Communications shown in FIG. 7 may correspond to process blocks 635 through 645 of FIG. 6. Network portion 700 may include access network 105 with wireless station 110, MEC clusters 135-1 and 135-2 of MEC network 130, data network 160, and end device 180.

For FIG. 7, it is assumed that the transport link 220 between two MEC clusters 135-1 and 135-2 is optimized, and that the latency between MEC clusters 135-1 and 135-2 is minimized. Furthermore, assume a wireless RAN connection 705 between end device 180 and one of distributed units 470 and a wired (e.g., optical fiber) connection between each distributed unit 470 and centralized unit 475.

In the example of FIG. 7, end device 180 is initially connected to MEC cluster 135 to receive services. SRS 140-1 may determine that both MEC cluster 135-1 and MEC cluster 35-2 can each meet the user/service requirements for latency and bandwidth for "High" and lower priority workloads (see, e.g., Table 1). Assume only MEC cluster 135-1 can meet service requirements for "Extremely High" and "Very High" priority workloads. MEC cluster 135-1 is closer to end device 180/wireless station 110 than MEC cluster 135-2. Thus, the priority would be to use resources in MEC cluster 135-1 (e.g., via link 120-1).

If the situation in MEC cluster 135-1 changes and resources in MEC cluster 135-1 are heavily used, "High" (or lower) priority traffic from end device 180 can be routed to MEC cluster 135-2 (e.g., via link 120-2). Inter-SRS communications manager 320 may instruct UPF 445-1 to communicate with UPF 445-2 to transfer context data for the session (e.g., via link 220). However, "Extremely High" or "Very High" priority traffic from end device 180 would not be off-loaded from MEC cluster 135-1 to MEC cluster 135-2. Instead, MEC cluster 135-1 may re-purpose local resources to meet "Extremely High" or "Very High" priority demands.

Figure 8:
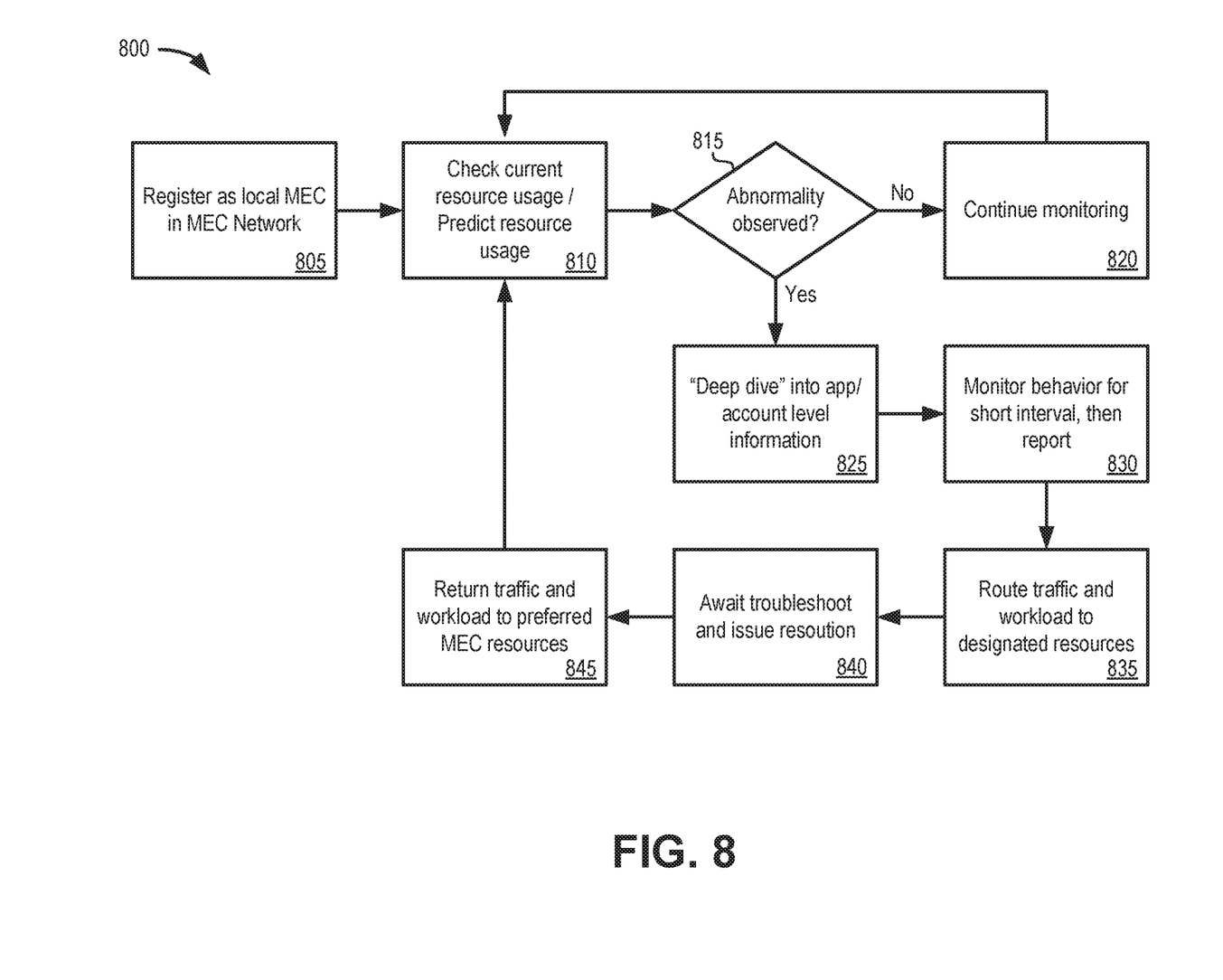
FIG. 8 is a flow diagram illustrating an exemplary process for handling abnormal workloads in an MEC area of the MEC network of FIG. 1.

FIG. 8 is a flow diagram illustrating an exemplary process 800 for managing abnormalities in MEC network 130. In one implementation, process 800 may be implemented by an SRS 140 in an MEC cluster 135. In another implementation, process 800 may be implemented by more than one MEC clusters 135 in conjunction with one or more other devices in network environment 100.

As shown in FIG. 8, an MEC cluster may be registered as a local MEC cluster for an MEC network (block 805) and may check for current resource usage and/or predict resource usage (block 810). For example, as described above in connection with FIG. 6, SRS 140 may register a corresponding local MEC cluster 135 to provide subscription based updates with other MEC clusters in different geographic areas and may monitor MEC resource use.

Process 800 may also include determining if an abnormality is observed (block 815). For example, SRS 140 (e.g., abnormality/emergency handler 340) monitor for a signal indicating an abnormality with MEC cluster 135, which may include signals indicating, for example, change in typical use patterns, slow responses when workloads are low, etc.

If no abnormality is observed (block 815—No), process 800 may continue to monitor for abnormalities (block 820) and return to process block 810. If an abnormality is observed (block 815—Yes), process 800 may include examining application and account level information (block 825), monitoring the service behavior (block 830), and routing the traffic/workload to designated resources (block 835). For example, SRS 140 (e.g., abnormality/emergency handler 340) may retrieve from PCF 425 user account information to confirm if user subscription settings (e.g., bandwidth, throttling, etc.) support QoS requirements for a requested service. Abnormality/emergency handler 340 may monitor and record session behavior for a short interval (e.g., one minute) and then instruct local MEC workload and traffic manager 350 to off-load the workload for the particular session using procedures described above (e.g., transfer from MEC cluster 135-1 to MEC cluster 135-2).

Process 800 may further include waiting for troubleshooting and issue resolution (block 840) and returning traffic and workload to the preferred MEC resources (block 845). For example, abnormality/emergency handler 340 may generate an alert signal for a network administrator to address the abnormality. In one implementation, the signal may include a link to the stored session behavior (e.g., recorded at block 825). Once the abnormality is resolved, he network administrator may update the status for abnormality/emergency handler 340 and local MEC workload and traffic manager 350 may return the traffic and workload to the preferred MEC cluster (e.g., MEC cluster 135-1).

Figure 9:
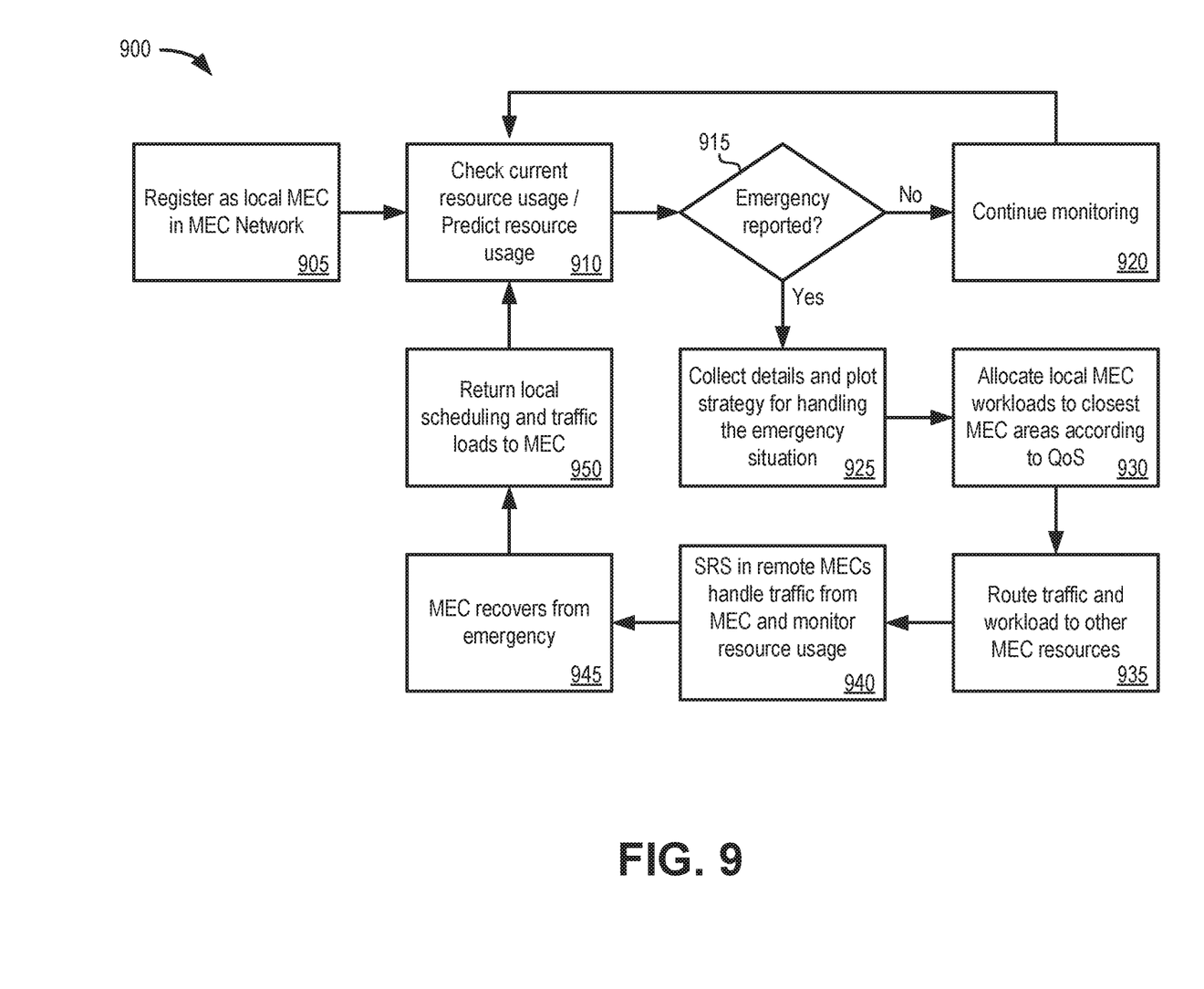
FIG. 9 is a flow diagram illustrating an exemplary process for emergency handling in an MEC area of the MEC network of FIG. 1.

FIG. 9 is a flow diagram illustrating an exemplary process 900 for managing emergencies in MEC network 130. In one implementation, process 900 may be implemented by an SRS 140 in an MEC cluster 135. In another implementation, process 900 may be implemented by more than one MEC clusters 135 in conjunction with one or more other devices in network environment 100. For handling emergency conditions, it may be assumed that the functions and availability of SRS 140 in a local MEC area 210 are not impacted by the emergency situation. In some implementations, to reduce the possibility that SRS 140 is impacted by an emergency situation, SRS 140 in local MEC area 210 may have certain protections, such as separate battery backup, emergency communication links (e.g., wired or wireless), separate partitions, etc.

As shown in FIG. 9, an MEC cluster may be registered as a local MEC cluster for an MEC network (block 905) and may check for current resource usage and/or predict resource usage (block 910). For example, as described above in connection with FIG. 6, SRS 140 may register a corresponding local MEC cluster 135 to provide subscription based updates with other MEC clusters in different geographic areas and may monitor MEC resource use.

Process 900 may also include determining if an emergency is observed (block 915). For example, SRS 140 (e.g., abnormality/emergency handler 340) may monitor for a signal indicating an emergency situation with MEC cluster 135, which may indicate a loss of power, a loss of communication (e.g., a fiber cut), flooding, malicious attack, etc.

If no emergency is observed (block 915—No), process 900 may continue for monitoring for abnormalities (block 920) and return to process block 910. If an emergency is observed (block 915—Yes), process 900 may include collecting details and plotting strategy for handling the emergency situation (block 925), and allocating local MEC workloads to a closest MEC area according to QoS requirements (block 930). For example, SRS 140 (e.g., abnormality/emergency handler 340) may collect data regarding the scope/impact of the emergency and determine which (or all) local MEC resources are impacted. Abnormality/emergency handler 340 may identify other available MEC clusters to which workloads can be offloaded. Abnormality/emergency handler 340 may map out assignments for different workloads to available remote MEC clusters 135 based on priority and QoS requirements.

Process 900 may further include routing the traffic/workload to designated resources (block 935). For example, SRS 140 (e.g., abnormality/emergency handler 340) may instruct local MEC workload and traffic manager 350 to off-load the workload for affected sessions using procedures described above (e.g., transfer from MEC cluster 135-1 to MEC cluster 135-2).

Process 900 may include handling traffic from the local MEC at the remote MEC clusters and monitoring resource usage (block 940), identifying recovery (block 945), and returning traffic and workload to the preferred MEC resources (block 950). For example, SRS 140 at each remote MEC area 210 may manage re-routed traffic according to traffic policies until receiving an indication that the original MEC cluster has recovered from the emergency condition. Once the abnormality is resolved, a network administrator may update the status for abnormality/emergency handler 340 and local MEC workload and traffic manager 350 for the current MEC cluster may return the traffic and workload to the preferred MEC cluster (e.g., from MEC cluster 135-2 to MEC cluster 135-1).

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 6, 8, and 9, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device. A non-transitory storage medium includes one or more of the storage mediums described in relation to memory/storage 515.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A first network device in a first multi-access edge computing (MEC) cluster, comprising:
   a first communications interface for exchanging data with a wireless station;
   a second communications interface for exchanging data with other network devices in multiple other MEC clusters;
   one or more memories to store instructions; and
   one or more processors configured to execute the instructions to:
      store, in the memory, threshold values indicating overload conditions and priority workload rules for resource usage by the first MEC cluster,
         wherein the priority workload rules designate static priority levels for different types of traffic and different threshold values for each designated static priority level, and
         wherein the priority workload rules are the same at the other network devices,
      monitor resource usage in the first MEC cluster,
      assign priority levels to different incoming workloads, based on the priority workload rules,
      determine, based on the monitoring, when a resource usage reaches one of the threshold values for one of the priority levels,
      identify, from the other network devices, available resources in the multiple other MEC clusters,
      select a second MEC cluster, of the multiple other MEC clusters, to offload a local workload, wherein the selecting is based on the priority workload rules, and
      redirect, based on the identifying, at least some of the resource usage associated with workloads associated with a threshold that has been reached from the first MEC cluster to the second MEC cluster.

2. The first network device of claim 1, wherein the one or more processors are further configured to execute the instructions to:
   register with the other network devices for participation in an intelligent MEC resource scheduling service; and
   send to the other network devices a message indicating local resource usage levels or availability at the first MEC cluster.

3. The first network device of claim 1, wherein, when monitoring, the one or more processors are further configured to execute the instructions to:
   monitor current resource usage and predict future resource usage.

4. The first network device of claim 3, wherein, when predicting future resource usage, the one or more processors are further configured to execute the instructions to:
   apply artificial intelligence algorithms to predict local future workloads for the first MEC cluster.

5. The first network device of claim 1, wherein, when identifying the available resources, the one or more processors are further configured to execute the instructions to:
   receive periodic resource usage messages from the other network devices.

6. The first network device of claim 5, wherein each of the periodic resource usage messages indicates one or more of a minimum available bandwidth, a maximum latency value, or a length of available time for resources.

7. The first network device of claim 1, wherein, when identifying the available resources, the one or more processors are further configured to execute the instructions to:
   verify the second MEC cluster's ability to meet quality of service (QoS) requirements for an application instance.

8. The first network device of claim 7, wherein the verifying includes identifying a lowest latency between the second MEC cluster and an end device requesting MEC resources.

9. The first network device of claim 7, wherein, when identifying the available resources, the one or more processors are further configured to execute the instructions to:
   compare latency times of the second MEC cluster with other latency times for another cluster of the multiple other MEC clusters.

10. A method, comprising:
   storing, in a memory of a first network device of a first multi-access edge computing (MEC) cluster of multiple MEC clusters, threshold values indicating overload conditions and priority workload rules for resource usage by the first MEC cluster,
      wherein the priority workload rules designate static priority levels for different types of traffic and different threshold values for each designated static priority level, and
      wherein the priority workload rules are the same at other network devices in the multiple MEC clusters;
   monitoring, by the first network device, resource usage in the first MEC cluster;
   assigning priority levels to different incoming workloads, based on the priority workload rules;
   determining, by the first network device and based on the monitoring, when a resource usage reaches one of the threshold values for one of the priority levels;
   identifying, by the first network device and from the other network devices, available resources in the multiple other MEC clusters;
   selecting, by the first network device, a second MEC cluster, of the multiple other MEC clusters, to offload a local workload, wherein the selecting is based on the priority workload rules; and
   redirecting, by the first network device and based on the identifying, at least some of the resource usage associated with workloads associated with a threshold that has been reached from the first MEC cluster to the second MEC cluster.

11. The method of claim 10, further comprising:
registering, by the first network device with the other network devices, for participation in an intelligent MEC resource scheduling service; and
sending, by the first network device and to the other network devices, a message indicating local resource usage levels or availability at the first MEC cluster.

12. The method of claim 10, wherein monitoring the resource usage in the first MEC cluster further comprises:
monitoring current resource usage and predicting future resource usage by the first MEC cluster.

13. The method of claim 12, wherein predicting future resource usage further comprises:
applying artificial intelligence algorithms to predict local future workloads for the first MEC cluster.

14. The method of claim 10, wherein identifying the available resources further comprises:
sending, to the other network devices, a request for resource availability; and
receiving, from the other network devices, resource usage messages responsive to the request for resource availability.

15. The method of claim 10, wherein each of the resource usage message indicates one or more of a minimum available bandwidth, a maximum latency value, or a length of available time for resources.

16. The method of claim 10, wherein identifying the available resources further comprises:
verifying the second MEC cluster's ability to meet quality of service (QoS) requirements for an application instance.

17. The method of claim 10, wherein the identifying includes identifying a lowest latency between the second MEC cluster and an end device requesting MEC resources.

18. A non-transitory, computer-readable storage media storing instructions executable by one or more processors of one or more devices, which when executed cause the one or more devices to:
store, in a memory, threshold values indicating overload conditions and priority workload rules for resource usage by a first multi-access edge computing (MEC) cluster of multiple MEC clusters,
wherein the priority workload rules designate static priority levels for different types of traffic and different threshold values for each designated static priority level, and
wherein the priority workload rules are the same at other network devices in the multiple MEC clusters;
monitor resource usage in the first MEC cluster;
assign priority levels to different incoming workloads, based on the priority workload rules;
determine, based on the monitoring, when a resource usage reaches one of the threshold values for one of the priority levels;
identify available resources in the multiple other MEC clusters;
select a second MEC cluster, of the multiple other MEC clusters, to offload a local workload, wherein the selecting is based on the priority workload rules; and
redirect, based on the identifying, at least some of the resource usage associated with workloads associated with a threshold that has been reached from the first MEC cluster to the second MEC cluster.

19. The non-transitory, computer-readable storage media of claim 18, further comprising instructions to:
detect, in the first MEC cluster, an abnormal condition;
automatically collect, in response to the detection, additional data related to the abnormal condition for a period of time; and
allocate workload from the first MEC cluster to one of the other clusters of the multiple MEC clusters.

20. The non-transitory, computer-readable storage media of claim 18, wherein the instructions to monitor resource usage in the first MEC cluster, further comprise instructions to:
monitor current resource usage and predict future resource usage.

* * * * *